United States Patent
Mittal et al.

(10) Patent No.: US 10,353,684 B2
(45) Date of Patent: Jul. 16, 2019

(54) METHOD TO LAUNCH AN APPLICATION ON A MOBILE DEVICE USING SHORT CODE

(71) Applicants: Sandeep Mittal, Cupertino, CA (US); Rajesh Sao, Sunnyvale, CA (US)

(72) Inventors: Sandeep Mittal, Cupertino, CA (US); Rajesh Sao, Sunnyvale, CA (US)

(73) Assignee: Flytxt BV, Nieuwegein (NL)

( * ) Notice: Subject to any disclaimer, the term of this patent is extended or adjusted under 35 U.S.C. 154(b) by 0 days.

(21) Appl. No.: 13/645,739

(22) Filed: Oct. 5, 2012

(65) Prior Publication Data

US 2013/0205294 A1 Aug. 8, 2013

(30) Foreign Application Priority Data

Feb. 8, 2012 (IN) .............................. 476/CHE/2012

(51) Int. Cl.
*G06F 8/60* (2018.01)
*G06F 9/445* (2018.01)

(52) U.S. Cl.
CPC ................ *G06F 8/60* (2013.01); *G06F 9/445* (2013.01)

(58) Field of Classification Search
CPC .................................. G06F 8/60; G06F 9/445
See application file for complete search history.

(56) References Cited

U.S. PATENT DOCUMENTS

| | | | |
|---|---|---|---|
| 8,176,437 B1* | 5/2012 | Taubman | 715/810 |
| 8,799,398 B2* | 8/2014 | Sugaya | 709/214 |
| 2004/0177260 A1* | 9/2004 | Gilfix et al. | 713/193 |
| 2005/0074028 A1* | 4/2005 | Wugofski et al. | 370/468 |
| 2006/0161889 A1* | 7/2006 | Stabb | G06F 3/0482 717/113 |
| 2006/0161981 A1* | 7/2006 | Sheth | G06F 9/4486 726/22 |
| 2008/0306782 A1* | 12/2008 | Ephrati | G06Q 30/02 705/14.41 |
| 2009/0254912 A1* | 10/2009 | Roundtree et al. | 718/102 |
| 2011/0185354 A1* | 7/2011 | Tanner et al. | 717/178 |
| 2012/0222133 A1* | 8/2012 | Kidron | 726/28 |
| 2012/0254042 A1* | 10/2012 | Ludemann | 705/78 |
| 2013/0067024 A1* | 3/2013 | Vasters | 709/217 |

\* cited by examiner

*Primary Examiner* — Wei Y Zhen
*Assistant Examiner* — Amir Soltanzadeh
(74) *Attorney, Agent, or Firm* — Fish & Richardson P.C.

(57) ABSTRACT

A Quick Application Launch System that serves for rapid launch of varied types of applications in a range of Portable Computing Devices. The quick application launch system includes a Mobile Server Platform (MSP) and a Client Application Unit (CAU).

10 Claims, 6 Drawing Sheets

METHOD TO LAUNCH AN APPLICATION ON A MOBILE DEVICE USING SHORT CODE

CROSS-REFERENCE TO RELATED APPLICATIONS

Pursuant to 35 U.S.C. § 119, this application claims the benefit of a foreign priority of Indian Patent Application No. 476/CHE/2012, filed Feb. 8, 2012, whose disclosure content is hereby incorporated by reference in its entirety.

BACKGROUND

This specification relates to launching relevant application in portable computing device.

Several technologies, especially in recent times have tried to address various problems related to application launch in portable computing devices. The sector is still in a nascent stage as much of the patent literature found are only in the publication stage and are yet to be granted. Some types of launch initiative are simple, having software embedded in the mobile terminal or in a server to affect a launch.

US patent application 2010015798 describes a technology where a server acts as repository of data about the application and at any can give information about the when and where a given application was installed. However, it does not have a special method for launch of application.

US patent application 20080163246 also talks of a method for launching an application in a computing device. The description is very generic and the method does not better user experience during download. Besides there is a ambiguity in the disclosure.

WIPO application 20100185727 has a descriptor that allows user to decide whether the application useful or not through a descriptor provided in the PCD.

PCT application number 8069247 uses metadata of application to assist in informing user of whether a given Portable Computing Device can or cannot support an application. Novel method for launch of application is not described.

PCT application number 20050184164 have smart card that resides in a portable Computing Device, however, it needs to interact with the computing device to help user to find the application. The disclosure has no provisions for launching an application in a novel method in a PCD.

US patent application 20070083906 describes a so called, "content navigator," where the user can access through a mobile terminal content present in another work station. The inventor calls this "launch of content in the mobile station." However it does not have methods to actually launch application in a Portable Computing Device.

The Chinese patent application 100681928 also describes accessing applications through specific key that bind to certain application key numbers. However, the description does not have any information on servers; types of platform/s served and so on. The inventive idea cannot be improvised for use in various types of platforms and on reading the disclosure one gets the impression that the invention is meant exclusively for BREW applications.

PCT application 100626178 uses RFID codes for accessing an application. However, the user needs to have an RFID reader and other paraphernalia and it cannot be as simple as using a keypad. The device for this can get very expensive.

U.S. Pat. No. 7,676,221 by Round tree et al, and their earlier U.S. Pat. No. 7,881,703 talks of launching an application through a call intercept method. Here, a user needs to make a call using any a pre-assigned number to reach customer care in a given network. The user is not compelled to finish the call to get help but will be provided with answers directly through via an interactive help menu on the displayed on the mobile phone. However, this technology does not address the need of mobile phones that do not have call intercept capabilities and also not tailored for use in phones with different and sometimes very high-end systems.

There is a need in the art for a novel system that could be used by customers with all types of mobile terminals. There is a particular need for reaching customers who do not have call intercept functions on their mobile phones. The said invention has been devised to address this specific need and help improve quality of user experience when launching applications.

One advantage of the new system over the other close patent is that this system will work in all devices even on all other devices where call intercept is not available.

SUMMARY

This specification describes technologies relating to a method to launching applications on a mobile device.

A first embodiment includes a Quick Application Launch System (QALS) that serves for rapid launch of varied types of applications in a range of Portable Computing Devices that is complete with a Mobile Server Platform (MSP) and a Client Application Unit (CAU).

A second embodiment includes the QALS as described in the first embodiment containing the MSP and CAU, having intelligence provided by a proprietary software that executes the inventive process intended by the novel embodiments contained in the QALS also as described in the first embodiment.

A third embodiment includes Said Portable Computing Device operated by the Quick Application Launch System as described in the first embodiment includes but not limited to Mobile terminals, touchpad, Lap tops, Net books.

A fourth embodiment includes a QALS as described in the first embodiment that has operational capabilities to execute the inventive processes over a wide range of mobile terminals which includes but not limited to an android platform, Apple's iOS platforms, Symbian platform, Blackberry platform, Windows Mobile platform, J2ME, WebOS and others.

A fifth embodiment includes the Mobile Server Platform as described in the first and second embodiments contains a novel embodiment Quick Launch Application Server (QLAS) that may be reside as a physical hardware or computed in a cloud system.

A sixth embodiment includes the Quick Launch Application Server as described in the fifth embodiment and found in the Mobile Server Platform as described in the first and second embodiments has the Application Download Engine (ADE) and the Content Engine (CE).

A seventh embodiment includes the Application Download Engine as described in the sixth embodiment found in the MSP as described in the first and second embodiments provides the technology for download of the application from the QLAS on to the PCD.

A eighth embodiment includes the Content Engine as described in the sixth embodiment, found in the MSP as described in the first and second embodiments having the dual function of interacting with network messages and preparing and sending launch messages to Client Application Unit as described in the first and second found in the PCD.

A ninth embodiment includes the network interaction function as described in the eighth embodiment processed by the Content Engine as described in the sixth and eighth embodiments that constitutes receiving messages by integrating with USSD or IVR channels.

A tenth embodiment includes the function of preparing and sending launch messages as described in the eighth embodiment by the CE as described in the sixth, eighth and ninth embodiments could be in but not limited to WAP push, SMS, APNS, C2DM, MPNS formats.

An eleventh embodiment includes the Client Application Unit (CAU) as described in the first and second embodiments containing the Quick Launch Module (QLM), constituting the unique embodiments for executing the inventive step.

A twelfth embodiment includes the QLM as described in the eleventh embodiment found in the CAU as described in the first, second and eleventh embodiments having the intelligence to intercept application launch messages received by the Application Library to execute the novel inventive step namely the quick launch.

A thirteenth embodiment includes the QLM as described in the eleventh found in the CAU as described in the first, second and eleventh embodiments has the intelligence to interpret varied application launch messages intercepted (as described in the twelfth) and prepared and sent via the CE as described in the sixth, eighth, ninth and tenth embodiments.

A fourteenth embodiment includes the QLM as described in the eleventh, twelfth and thirteenth embodiments executing quick launch of the precise application requested without need for user intervention.

Particular embodiments of the subject matter described in this specification can be implemented so as to realize one or more of the following advantages. One advantage of the new system over the other close patent is that this system will work in all devices even on all other devices where call intercept is not available.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The Invention pertains to the field of enabling a quick application launch in various types of Portable Computing Devices (PCD). Use of specific/special or even mundane application is increasing among the current technology savvy populace. To cater to the ever-increasing demand, network providers and application makers are flooding the market with many more applications. Users need to search and find the application for launch in their PCD. This becomes time consuming and sometimes difficult when there are many applications involved. The Unique embodiment, namely the Quick Launch Module (QLM) solves this problem by intercepting and interpreting launch commands emanating from the novel Mobile Server Platform (MSP) to quickly launch the application. The Mobile Server Platform is the other Novel embodiment that makes note of PCD information from network message and prepares the launch message that is to be sent to the PCD. The whole process is very simple for the user, who may send either a Short Character Code (SCC) or a Short Numerical Code (SNC) to the network gateways. The SSC reaches the MSP through the USSD gateway, while the SNC reaches the MSP via the Interactive Voice Response (IVR) gateway to bring about the quick launch. The unique embodiments of the invention are programmed by a special proprietary software that allows the above mentioned operation and makes the system operable in a variety of PCD platforms and network providers. The advantage of the system over prior art is that it is able to bring about quick launch even in mobile stations that do not have call intercept facilities.

Preamble:

The following specification particularly describes a novel system and method for quickly launching different types of applications in Portable Computing Device. Users of Portable Computing Devices (such as a mobile terminal) are increasing opting for the convenience of using them for a variety of functions which were conventionally done with other appliances or done manually. This has been made possible by the growth of supportive technology that provides a plethora of new applications for every type of user need. The network providers have likewise responded positively by making these applications available to users through download options. User needs are constantly increasing and so are applications/application providers. Networks are catering to the demand by adding new applications to their cache and this makes it onerous to locate relevant applications. The said invention provides a method for quick launch of an application in any Portable Computing Device. The novel embodiments of the invention are embedded with appropriate intelligence to enable performance in a variety of networks and platforms. Further, a request for the application launch may be made either by the USSD technology through character codes or by interaction with the Interactive Voice Response (IVR) system of the provider. The former has the advantage of completing the request even if the mobile terminal does not have call intercept facilities. Additionally, the novel embodiment of the said invention can affect quick launch in all types of mobile terminals from very low-end models to highly sophisticated contraptions.

Field and Use of Invention

The invention is in the field of enabling quick launch of relevant application in Portable Computing Devices such as a mobile terminal. Network providers currently cater to a growing demand for superior user experience. Currently, whenever Users want to locate specific applications available in their respective Portable Computing Device there is a need for searching for required application from a large list. This exercise proves to be time consuming. Much of the technology built is left untouched by clients specifically because of time constraints or lack of quick access. The said invention seeks to redress this state of art by providing an easy to access "quick application launch system" for users, application providers and network providers alike. Important and common application systems are stored in a separate Mobile Server Platform and allowed access for usage by Portable Computing Device users. The network provider assigns a specific code that may be a character/numeric code, to every application in the Mobile Server Platform. The user when in need of an application simply keys in the specific short code to select the desired application. Upon selection the unique embodiment namely the Client Application Unit (CAU), launches it in the Portable Computing Device. The Quick Launch Module embedded in the CAU is the unique embodiment that intercepts the message from the MSP to quickly launch the application. This method of accessing an application will make it very easy for users to quickly access available application. The Quick Access method proposed would also assist application providers by giving them a common platform to reach all networks and allow network providers provide. The short codes being specific may also help in branding any special applications that network providers may provide.

Object of the Invention

The principle object of the invention is to allow a quick launch of an application in a Portable Computer Device using novel embodiments.

Another object of the invention is to provide a ubiquitous platform for application launch in varied network technologies.

One more object of the invention is to ensure that the quick launch facility is enabled in mobile stations which do not have call intercept facilities.

Yet another object of the invention is to enable the quick launch of applications in a range of Portable Computing Device operating on various platforms.

Statement of the Invention

Accordingly the invention provides unique embodiments such as the Quick Launch Module that has the intelligence to quickly launch applications based on messages received from the Mobile Server Platform (MSP). The MSP Provides a common platform for receiving messages either through the USSD technology or through the network's IVR system. The Quick Launch Module has the intelligence to launch a given application in any type of mobile terminal based on commands from the MSP.

Detailed Description

Figure 1:
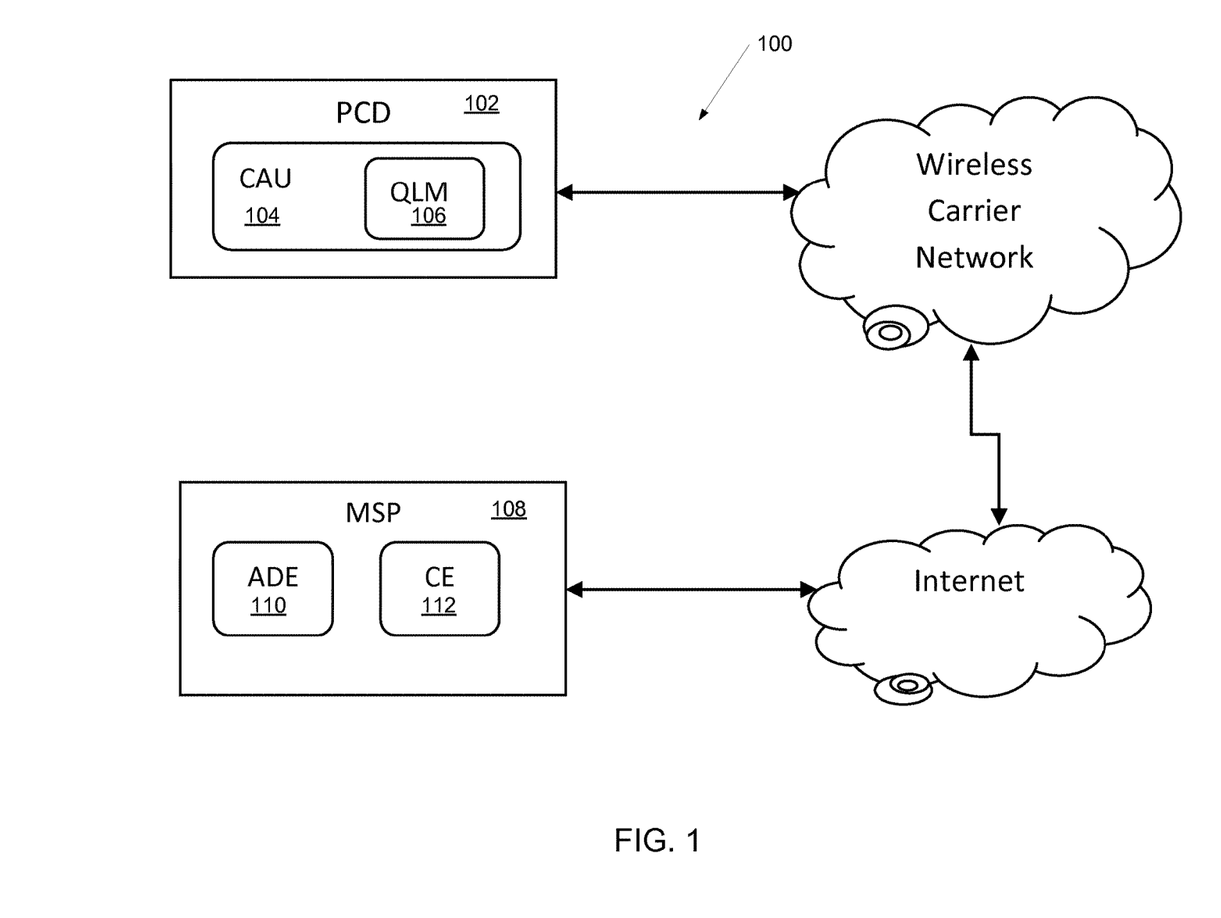
FIG. 1 diagrammatically represents the overall structure of the entire Quick Application Launch System.

FIG. 1 diagrammatically represents the overall structure of the entire Quick Application Launch System. It also shows the flow of communication between the different parts of the said inventive system.

The unique embodiments devised for such working have been denoted in two parts; namely the Portable Computing Device (PCD) 102 that contains the Client application Unit (CAU) 104 which has a special Quick Launch Module (QLM) 106 programmed into it.

The other component that carries unique embodiments for the purpose of working the invention is contained in the Mobile Server Platform (MSP) 108. The MSP has been uniquely defined by the Application Download Engine (ADE) 110 and the Content Engine (CE) 112.

Figure 2:
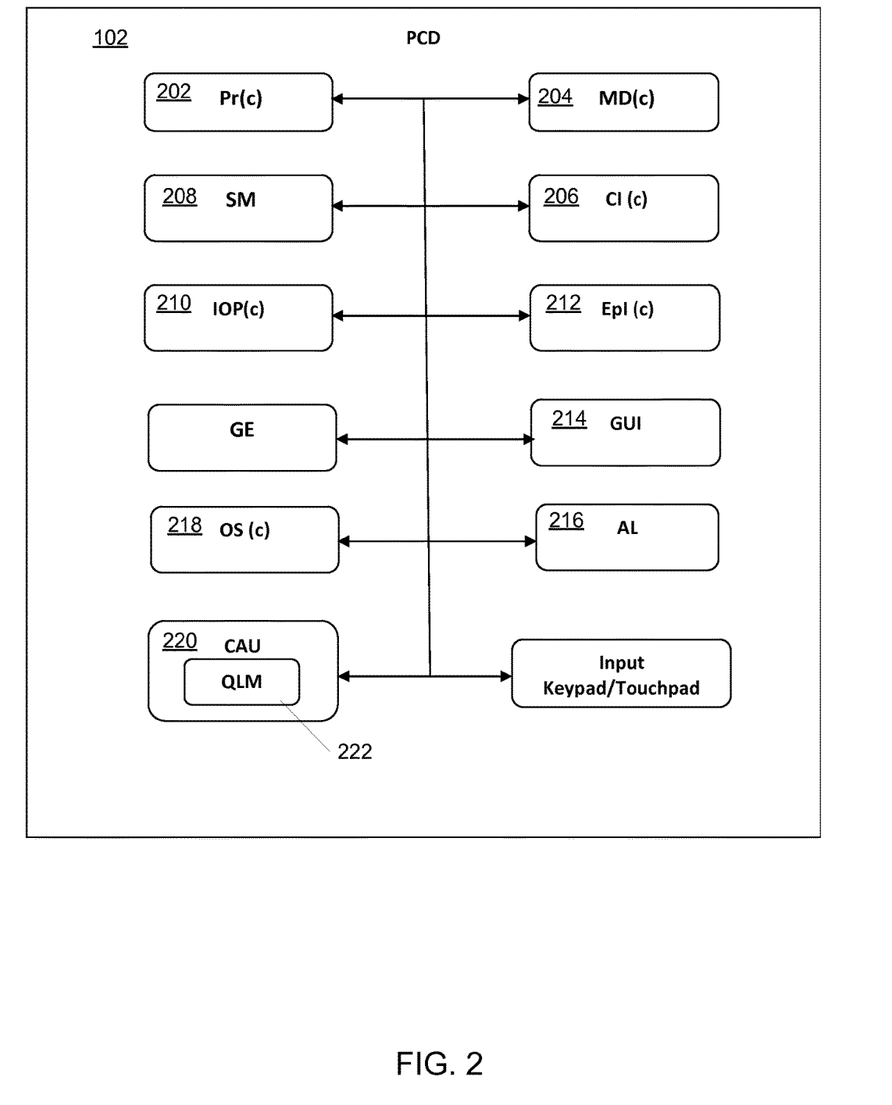
FIG. 2 illustrates a Portable Computing Device.

FIG. 2 illustrates the Portable Computing Device (PCD) 102, includes a processor 202 [Pr (c)] (that may be but not limited to a CPU or microchip), a Memory Device 204 [MD (c)] (that may be but not limited to a RAM or other suitable computing memory), a Communication Interface[CI (c)] 206, a Storage Module [SM (c)] 208, Input/Output port interfaces [IOP (c)] 210, an Expansion Port Interface [EpI (c)] 212, a Graphic User Interface (GUI) 214, An Input/Output Device (IOD), an Application Library (AL) 216, an Operating System [OS(c)] 218 and the unique embodiment Client Application Unit (CAU) 220 complete with the Quick Launcher Module 222 (QLM). The QLM is the unique embodiment designed to bring about quick launch of the application by intercepting launch message sent by the MSP.

Figure 3:
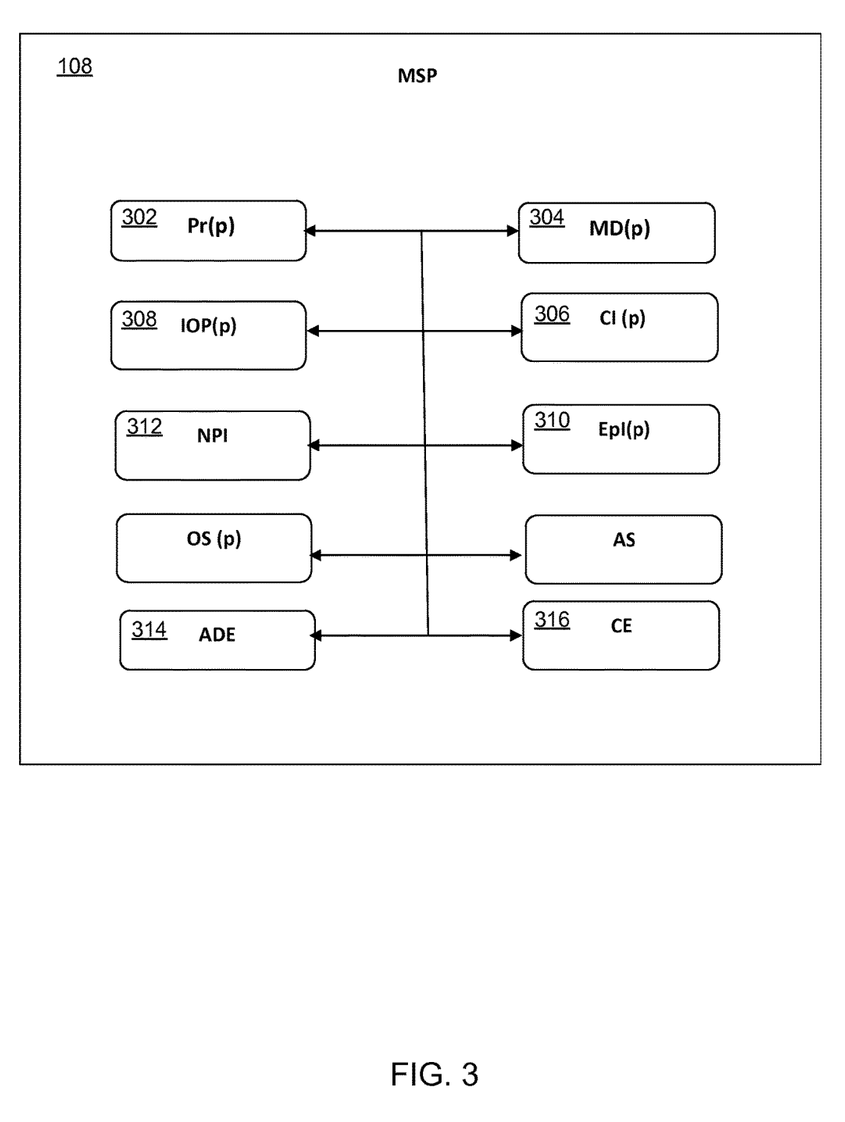
FIG. 3 represents a Mobile Platform Server.

FIG. 3 represents the Mobile Server Platform (MSP) 108 that includes, a processor 302 [Pr (p)] (that may be but not limited to a CPU or microchip), a Memory Device 304 [MD (p)] (that may be but not limited to a RAM or other suitable computing memory), a Communication Interface 306 [CI (p)], a Storage Module [SM (p)], Input/Output port interfaces 308 [IOP (p)], an Expansion Port Interface 310 [EpI (p)], a Network Port Interface 312 (NPI), the unique embodiment of the MSP, namely the Quick Launch Application Server (QLAS). The QLAS is constituted by other unique embodiments which are the Application Download Engine 314 (ADE) and the Content Engine 316 (CE).

Figure 4:
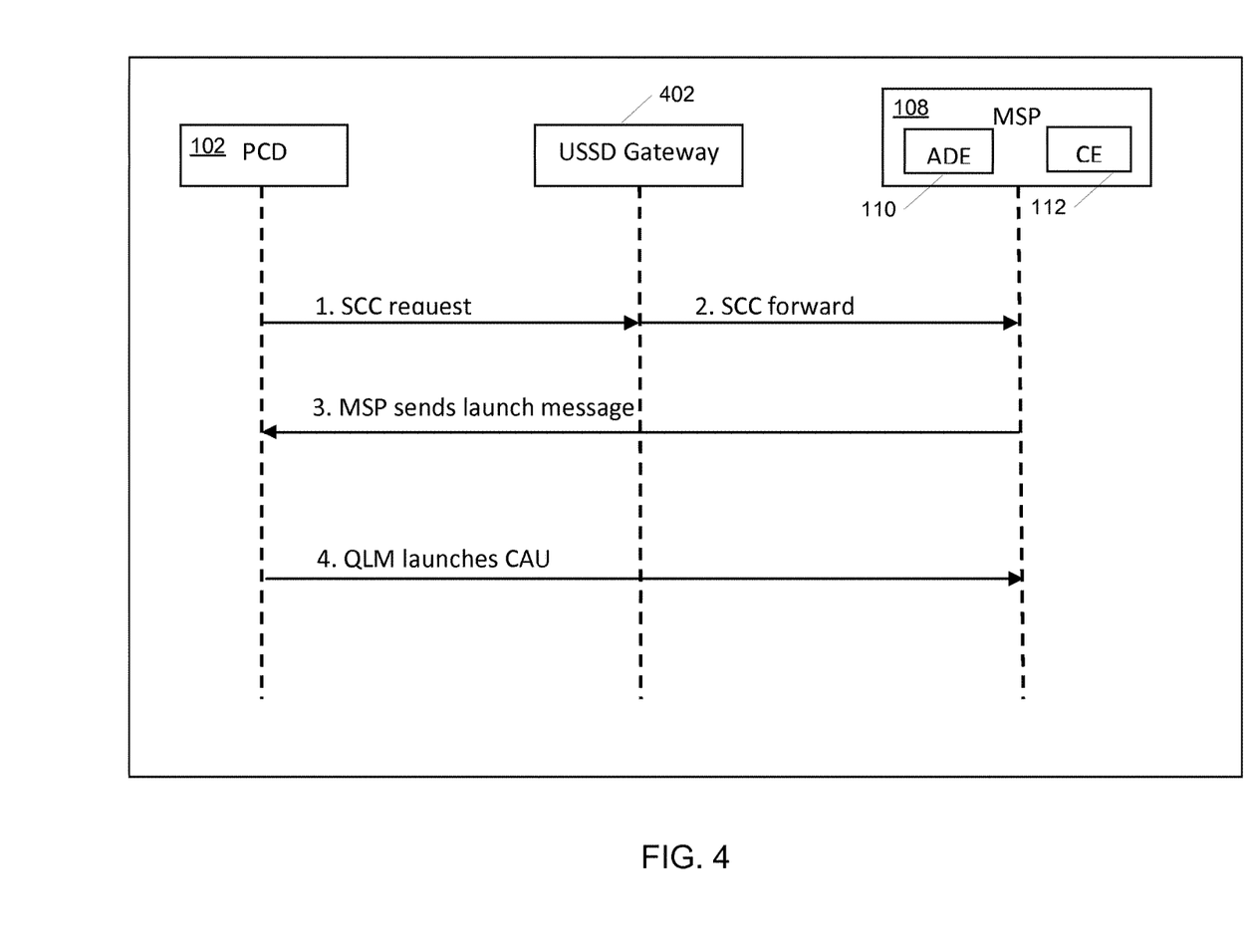
FIG. 4 shows a flow diagram of a launch of an application using the SSC method via the USSD technology.

FIG. 4 shows the flow diagram of a launch of an application using the SCC method via the USSD technology. The User sends a Short Character Code (SCC) from the respective PCD 102 to the USSD gateway 402 of the network, which in-turn forwards the same to the MSP 108. Client Application Unit (CAU) details are downloaded by the Application Download Engine 110 (ADE). The Content Engine 112 (CE) prepares and send launch message to respective PCD 102, referenced by the ADE 110. The launch message reaches the AL 216 of the PCD 102 and the same is intercepted by the QLM 106 and launches the application.

Figure 5:
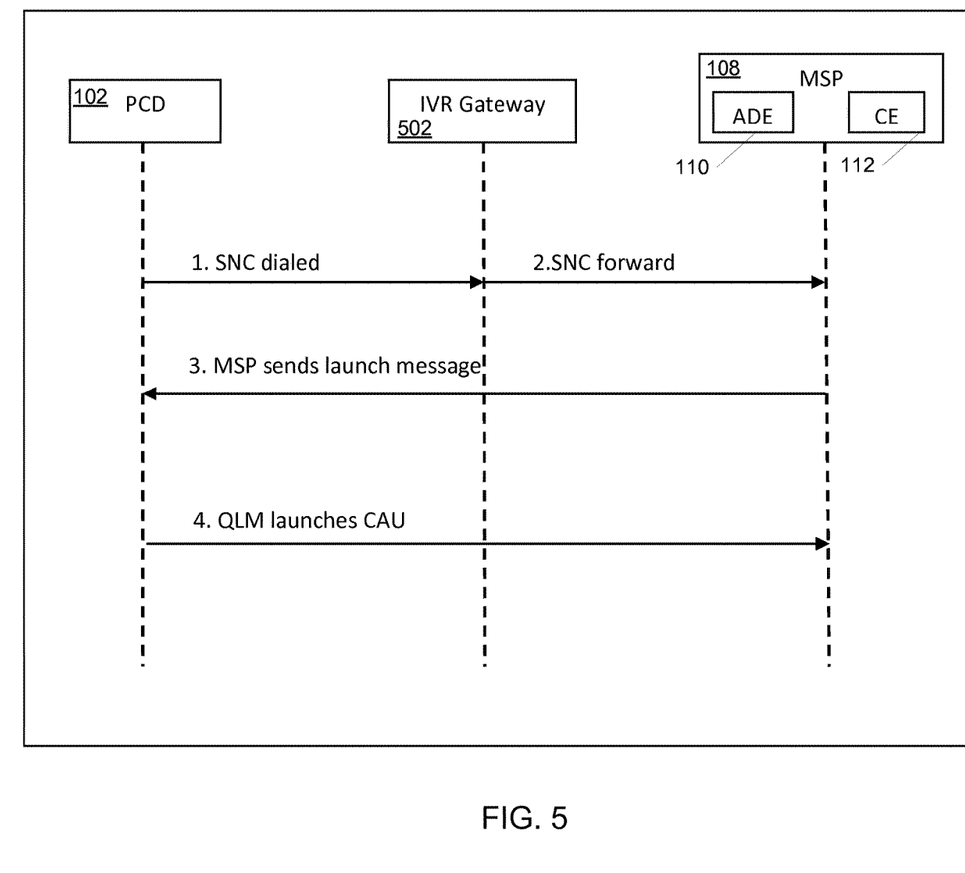
FIG. 5 shows the flow diagram of a launch of an application using the SNC method via the IVR technology.

FIG. 5 shows the flow diagram of a launch of an application using the SNC method via the IVR technology. The User sends a Short Numeric Code (SNC) from the respective PCD 102 to the Interactive Voice Response (IVR) gateway 502 of the network, which in-turn forwards the same to the MSP 108. Client Application Unit (CAU) details are downloaded by the Application Download Engine 110 (ADE). The Content Engine 112 (CE) prepares and send launch message to respective PCD, referenced by the ADE. The launch message reaches the AL of the PCD and the same is intercepted by the QLM and launches the application.

Figure 6:
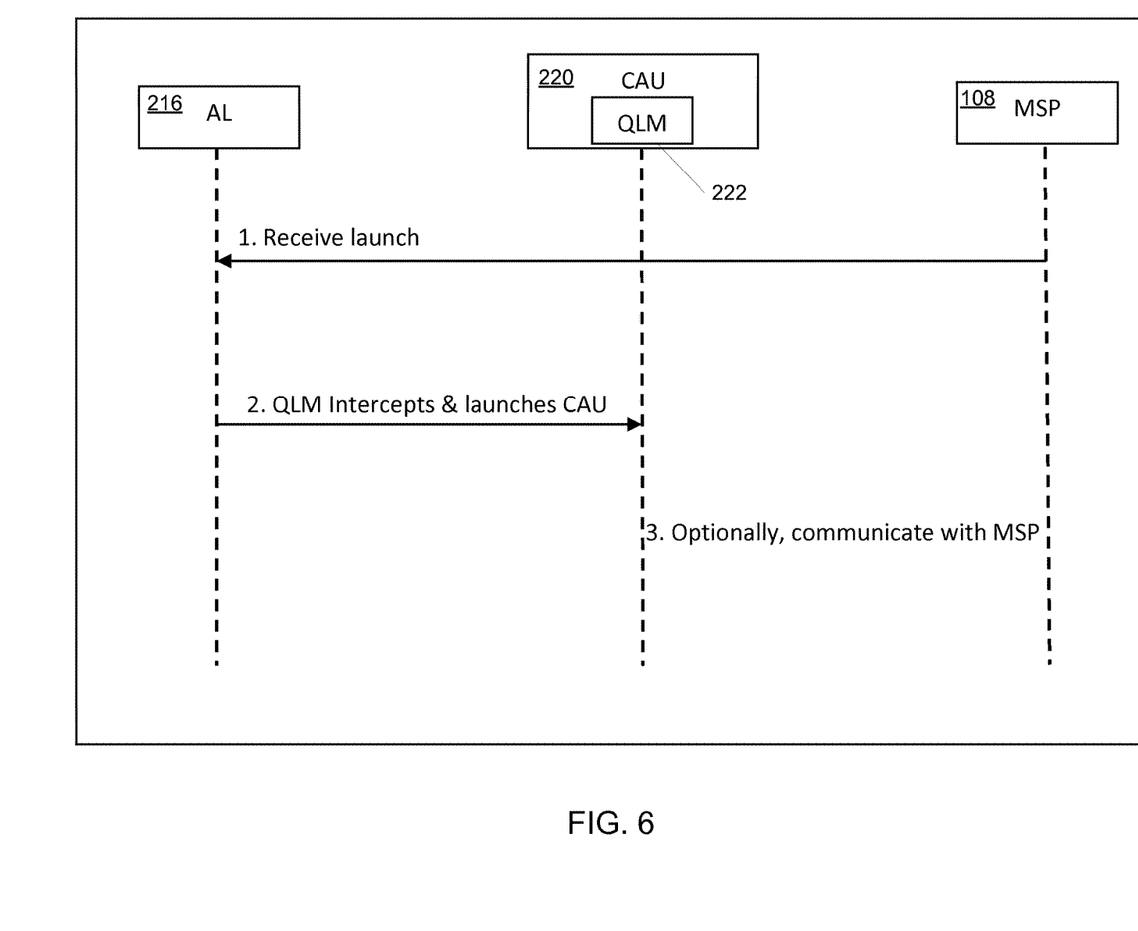
FIG. 6 diagrammatically represents the work flow during the quick launch phase.

FIG. 6 diagrammatically represents the work flow during the quick launch phase. The AL 216 receives the launch message prepared and sent by the MSP 108. The QLM 222 intercepts and interprets this message and launches the application. The Client Application Unit 220 (CAU) may optionally send a feedback about launch to the MSP 108.

Method of Working the Invention

A method to quick launch of an application installed on a Portable Computing Device using Special Codes comprising of the following steps:

The Mobile Server Platform initially enables download of various Client applications on to the Portable Computing Device through the Application Download Engine.

The Applications thus downloaded, installed and stored in the Storage Module found in the Portable Computing Device.

User enters the said Special Character Codes (SCC) or Special Numeric Codes (SNC) as specified by the provider through the IOD, which may be viewed by the user via the GUI.

Request Phase

The varied types of requests are sent and processed through different gateways and this has been described below in detail:

a. In one embodiment of the invention (as depicted in FIG. 4), the user dials a Special Character Code (SCC) through IOU of the PCD to access a given service deployed in the MSP using an application (CAU) installed on the PCD. The SSC in this case uses the USSD (Unstructured Supplementary Service Data)

technology and initiates a dialog with the USSD handling application deployed on the MSP. This service request comes to MSP by integrating with USSD gateway or any other USSD messaging solution.

b. In another embodiment of the invention (as depicted in FIG. 5), the user dials a specific Special Number Code (SNC) through the IOU of the PCD to access a given service deployed in the MSP using an application (CAU) installed on the PCD. The SNC is routed through the Interactive Voice Response (IVR) system of the network provider. Here the MSP receives the application request via the IVR system.

Launch Phase

The launch of application (as depicted in FIG. 6), may also follow different routes to accommodate various types of mobile terminals and their method of working of the invention for affecting different types of launched is provided below:

a. MSP sends a WAP (Wireless Application Protocol) Push message to PCD. The client PCD that is compatible with WAP push technology listens to the messages. On receiving the message/s for particular application/s, the QLM launches the application and allows user to interact with the GUI.

b. MSP sends encoded or plain text SMS (Short Message Service) message to PCD. The QLM running on the PCD intercepts this SMS message and matches said message for specific given application. The QLM launches the application and allows user to interact with the GUI.

c. MSP may choose to send a launch message to PCD via different channels depending upon the supported platform of the PCD. This includes but not limited to Apple Push Notification Service (APNS) for iOS devices, Cloud to Device Messaging Framework (C2DM) for Android devices and Microsoft Push Notification Service (MPNS) for Windows Phone Devices. The QLM acts on this launch message received from above mechanism. The QLM launches the application and allows user to interact with the GUI.

Method of Quick Launch through the QLM a. The AL found in the PCD receives the launch message from the MSP through either one of the methods described in the "launch phase."

b. The Quick Launch Module found in the Client Application Unit intercepts the launch message received by AL; the QLM will thereafter launch the application.

c. Every application found in the Portable Computing Device can be assigned a unique SCC or SNC by the respective service providers.

What is claimed is:

1. A Quick Application Launch System (QALS) including:

an application download engine configured to:
provide access to a plurality of applications to a portable computing device;

a server to:
store a short code and a rapid launch command for each of the plurality of applications provided by the application download engine,
receive a short code request from the portable computing device,
identify a rapid launch command that corresponds to the short code,
select a communication channel based on a platform on the portable computing device, wherein the communications channel is one of a wireless application protocol (WAP) push message, a short message service, an Apple Push Notification Service, a Cloud to Device Messaging Framework or a Microsoft Push Notification Service, and
send the rapid launch command to the portable computing device via the communications channel; and the portable computing device configured to:
send the short code to the mobile server platform via a Unstructured Supplementary Services Data (US SD) or interactive voice response (IVR) gateway, the short code identifying an application of the plurality of applications,
intercept the rapid launch command sent via the communication channel from the mobile server platform the rapid launch command referencing the application associated with the short code, and
in response to intercepting the rapid launch command on the communication channel, launch the application installed on the portable device without need for user intervention based on the received rapid launch command,
wherein each application on the portable computing device is assigned a unique short code.

2. The system of claim 1 wherein the portable computing device is a mobile terminal, touchpad, laptops, or netbooks.

3. The system of claim 1 wherein the server includes a Quick Launch Application Server (QLAS) that this is embodied as a physical hardware or computed in a cloud system.

4. The system of claim 3 wherein the Quick Launch Application Server includes an Application Download Engine (ADE) and the Content Engine (CE).

5. The system of claim 4 wherein the Application Download Engine as provides the technology for download of the application from the QLAS on to the PCD.

6. The system of claim 4 wherein the Content Engine is configured to interact with network messages and send launch messages to Client Application Unit.

7. The system of claim 1, wherein the (quick launch module) QLM is configured to intercept the rapid launch command and to execute an application based on the rapid launch command.

8. The system of claim 7, wherein the QLM is configured to interpret the rapid launch command.

9. The system of claim 8, wherein the QLM executes the quick launch of the application requested without need for user intervention.

10. The system of claim 1, wherein each short code is assigned to a unique application.

* * * * *